United States Patent
Granot et al.

(10) Patent No.: US 10,319,083 B2
(45) Date of Patent: Jun. 11, 2019

(54) IMAGE ARTIFACT DETECTION AND CORRECTION IN SCENES OBTAINED FROM MULTIPLE VISUAL IMAGES

(71) Applicant: SAMSUNG ELECTRONICS CO., LTD., Suwon-si, Gyeonggi-Do (KR)

(72) Inventors: Elad Granot, Hanniel (IL); Nathan Henri Levy, Givatayim (IL)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 146 days.

(21) Appl. No.: 15/644,339

(22) Filed: Jul. 7, 2017

(65) Prior Publication Data

US 2018/0018759 A1   Jan. 18, 2018

Related U.S. Application Data

(60) Provisional application No. 62/362,766, filed on Jul. 15, 2016.

(51) Int. Cl.
G06T 5/00 (2006.01)
G06T 5/50 (2006.01)

(52) U.S. Cl.
CPC ............ G06T 5/005 (2013.01); G06T 5/50 (2013.01); G06T 2207/10144 (2013.01); G06T 2207/20182 (2013.01); G06T 2207/20208 (2013.01)

(58) Field of Classification Search
CPC . G06T 2207/10144; G06T 2207/20182; G06T 2207/20208; G06T 5/005; G06T 5/50
See application file for complete search history.

(56) References Cited

U.S. PATENT DOCUMENTS

| | | | |
|---|---|---|---|
| 7,660,464 B1 | 2/2010 | Peterson | |
| 7,717,574 B1 | 5/2010 | Lundback et al. | |
| 8,027,538 B1 | 9/2011 | Peterson | |
| 8,942,509 B2 | 1/2015 | Cha et al. | |
| 8,957,984 B2 | 2/2015 | Vidal-Naquet | |
| 9,153,027 B2* | 10/2015 | Gallo | G06T 3/0068 |
| 2004/0036775 A1* | 2/2004 | Watson, Jr. | G06T 5/50 348/207.1 |

(Continued)

FOREIGN PATENT DOCUMENTS

| | | |
|---|---|---|
| JP | 2015011717 | 1/2015 |
| WO | 2014/206503 | 12/2014 |

OTHER PUBLICATIONS

Sen, et al., Robust Patch-Based HDR Reconstruction of Dynamic Scenes, University of California, Santa Barbara [online at the internet: URL:http://www.ece.ucsb.edu/~psen/Papers/SIGASIA12_HDR_PatchBasedReconstruction_LoRes.pdf].

(Continued)

*Primary Examiner* — Manuchehr Rahmjoo
(74) *Attorney, Agent, or Firm* — F. Chau & Associates, LLC

(57) ABSTRACT

The disclosure provides for globally detecting and correcting unwanted sensor artifacts arising from processing techniques combining multiple visual images into an output image while possessing information relating to a localized area of the image that can be accomplished during scanning of the image and independent of the number of images or the computer processing method used to acquire them.

17 Claims, 7 Drawing Sheets

False positive artifacts:    Noise environment    Light effect

False negative artifacts:    Ghosting    Thin line

(56) References Cited

U.S. PATENT DOCUMENTS

2015/0036024 A1 2/2015 Ng
2015/0078661 A1 3/2015 Granados et al.

OTHER PUBLICATIONS

Khan, et al., Ghost Removal in High Dynamic Range Images, University of Florida, Orlando, USA [online at the internet: URL: http://www.researchgate.net/profile/Erik_Reinhard/publication/224057723_Ghost_Removal_in_High_Dynamic_Range_Images/links/00b7d520cee09ba6cd000000.pdf].

Gallo, et al., Artifact-Free High Dynamic Range Imaging, University of California, Santa Cruz, Nokia Research Center, Palo Alto [online at the internet: http://citeseerx.ist.psu.edu/viewdoc/download?doi=10.1.1.225.1257&rep=rep1&type=pdf].

Tursun, et al., The State of the Art in HDR Deghosting: A Survey and Evaluation, Dept. of Computer Engineering, Eurographics 2015.

\* cited by examiner

IMAGE ARTIFACT DETECTION AND CORRECTION IN SCENES OBTAINED FROM MULTIPLE VISUAL IMAGES

CROSS-REFERENCE TO RELATED APPLICATIONS

This application claims the benefit under 35 U.S.C. § 119(e) to U.S. Provisional Patent Application No. 62/362,766, filed on Jul. 15, 2016 in the United States Patent & Trademark Office, the disclosure of which is incorporated by reference herein in its entirety.

TECHNICAL FIELD

This disclosure is in the technical field of visual image processing.

DISCUSSION OF RELATED ART

Visual image correction techniques (including de-ghosting) can be used with high dynamic range (HDR) images and other scenes generated from multiple visual images with different image sensor exposure times. The most common way to create an HDR scene is to capture (and then combine) multiple individual images depicting a visual scene which are created using different exposure times. Movement of an object in the scene occurring between different captures of an image (or movement of the camera sensor itself) may cause unwanted visual artifacts (such as ghosting or thin line) which should not be present but which nonetheless appear in the resulting visual image. Motion-related artifacts may also occur in de-noising algorithms (or other techniques) requiring a combination of multiple renderings of a scene to form a single visual image.

Motion compensation uses precise detection of the motion and consistent correction over the image when combining multiple visual images into a single resulting image. Detecting unwanted visual artifacts based solely on light radiation intensity differences may allow false negatives and/or false positives; e.g., motion-related artifacts with similar intensities might remain in the resulting image despite computer processing designed to remove them and/or newly-appearing objects (such as those created by a noisy camera sensor environment) might be detected incorrectly as motion.

Many techniques used for visual image correction utilize storing of the full image in computer buffer memory prior to removing such artifacts and can be performed only during post-image capture processing. Other real-time visual image processing techniques use special computer hardware to accomplish correction and sacrifice optimum image resolution. An alternate technique assigns to a visual image location (e.g., pixel) the light radiation intensity value(s) for which a majority of the individual image(s) are in agreement but this method uses a large number of images with at least some level of redundancy between them.

SUMMARY OF THE INVENTION

Exemplary embodiments of the invention as described herein generally provide for detecting and correcting unwanted sensor artifacts arising from processing techniques utilizing multiple visual images while possessing information relating to a localized area of the image that can be accomplished during scanning of the image and independent of the number of images or the computer processing method used to acquire them.

According to an exemplary aspect of the invention, a set of two or more visually inconsistent images are combined as an input from an image sensor and a single corrected image is output to eliminate any artifact(s) appearing in one (or more) of the input image(s) as follows:

For different images of a visual scene a local area is examined surrounding a reference pixel found substantially within the center of an array based at an identified image location to detect whether an artifact is present.

Correction is performed to remove an artifact that is detected based upon evaluating a statistical (e.g., aggregation and/or variance) analysis of light radiation intensity value difference(s) between different image combination(s) at the reference pixel location.

The image is optionally processed using signal-to-noise ratio reduction techniques to output a single corrected visual image that eliminates any one or more of the artifact(s) appearing in a detected region of at least one (or more) of the input image(s).

According to a further exemplary aspect of the invention, the detection and correction steps are divided into sub-steps relating to discovery of a new object and/or simple motion. If a new object is detected then a new object correction sub-step can find a stable image to use while ignoring others. If simple motion is detected then a simple motion correction sub-step can extend use of at least one previous image selection decision to maintain consistency.

According a to further exemplary aspect of the invention, there is provided a computer device containing software program instruction(s) executable by the computer to perform at least the foregoing operation(s) for detecting and correcting unwanted artifact(s) arising from technique(s) utilizing multiple visual image(s) input from a sensor and processed into an output image depicting a scene.

The subject matter which is regarded as the invention is particularly pointed out and distinctly claimed in the concluding portion of the specification, as set forth in claims which are to be interpreted as broadly as the law permits to cover the full scope of the invention, including all equivalents thereto.

DETAILED DESCRIPTION OF EXEMPLARY EMBODIMENTS

Figure 1:
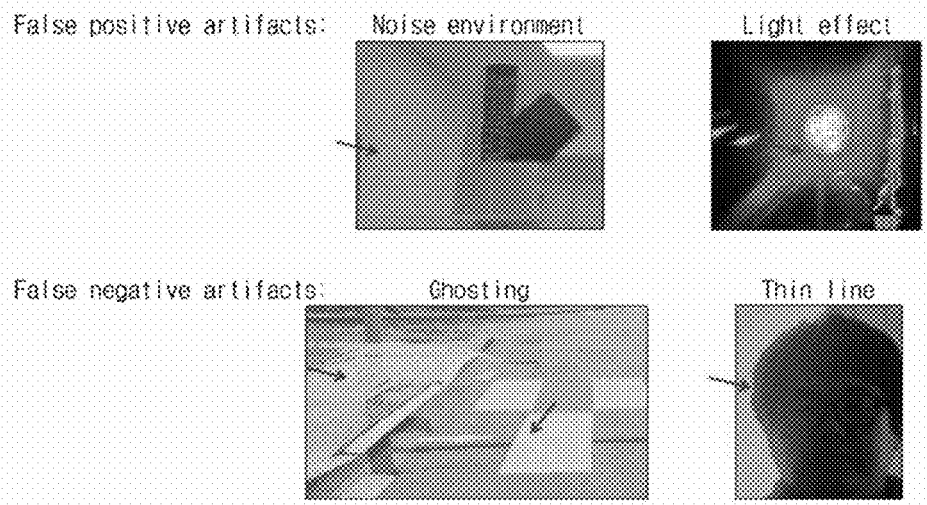
FIG. 1—Photographic illustrations of false negatives and/or false positives appearing in HDR digital visual images as a result of motion artifacts.

FIG. 1 shows photographic illustrations of false negatives that might appear in high dynamic range (HDR) visual images as a result of motion artifacts (such as ghosting or thin line) along with false positives taking the form of newly-appearing objects such as those created by a camera (or other image sensor) noise environment which appear in the resulting image. As shown with reference to FIGS. 2 & 3, a visual image 10 is comprised of an array 20 of pixel location(s) 30 that may be subjected to varying light radiation intensity (S) value(s) created through use of different image sensor exposure (E) time(s).

An image detection and correction method according to an exemplary embodiment disclosed herein assumes N>1 images $S^1 \ldots S^N$ taken from the same visual scene with different exposure times $E^1 \ldots E^N$ (respectively) and for an image sensor signal (S) there is assigned (as $S_{x,y}$) the light radiation intensity value of the pixel at location (x,y) in the subject image array. For simplicity in the examples below the following assumptions are made:

The images are sorted from the image with the shortest exposure time ($S^1$) to the one with the longest exposure time ($S^N$) such that for i>j then $E^i>E^j$.

An image is normalized according to its exposure time; e.g., the image ($S^i$) is captured as ($\hat{S}^i$) and its overall intensity value converted to $$\left(S^i = \hat{S}^i \cdot \frac{C}{E^i}\right)$$

for some constant C>0.

In the examples below, the visual images 10 are digitally scanned in a row-by-row (e.g., raster) arrayed order where the steps of the scan use only a small localized exposure area (e.g., patch) of each image around the scanned pixel. The edge size of the patch (in pixels) is denoted as P (such that the whole pixel patch for example would be of array size P×P) where the reference pixel 30 around which the patch is defined is substantially in the center of the pixel array 20.

In the examples below, two steps are used to correct an unwanted artifact with the first being its detection and the second being correction of the visual image in the detected region as follows:

For a given pixel position in an input image a local exposure patch (e.g., 7×7 pixels) is examined surrounding the subject reference pixel located centrally within the array to detect whether an artifact arising from an inconsistency between combined image(s) is present.

If an artifact is detected then correction is performed where an HDR algorithm can optionally be used to output a single resulting image.

For example, the following HDR algorithm can optionally be used to minimize the output image signal-to-noise ratio (SNR) by examining as the output pixel at point (x,y) the value $$(O_{x,y}) = \sum_{i=1}^{K} \frac{E^i}{\sum_{j=1}^{k} E^j} S^i$$

where (K)=$\mathrm{argmax}_k\{S_{x,y}^k$ is not burnt$\}$ is the numeric index of an input image with a maximum exposure time (E) that yields a defined useful light radiation intensity value for (S) at pixel (x,y) and (i,j,k) are natural numeric counting value(s) defined within the range set by the equation and where the algorithm assumes depiction of the same visual scene in all input images without any motion artifacts occurring.

Figure 7:
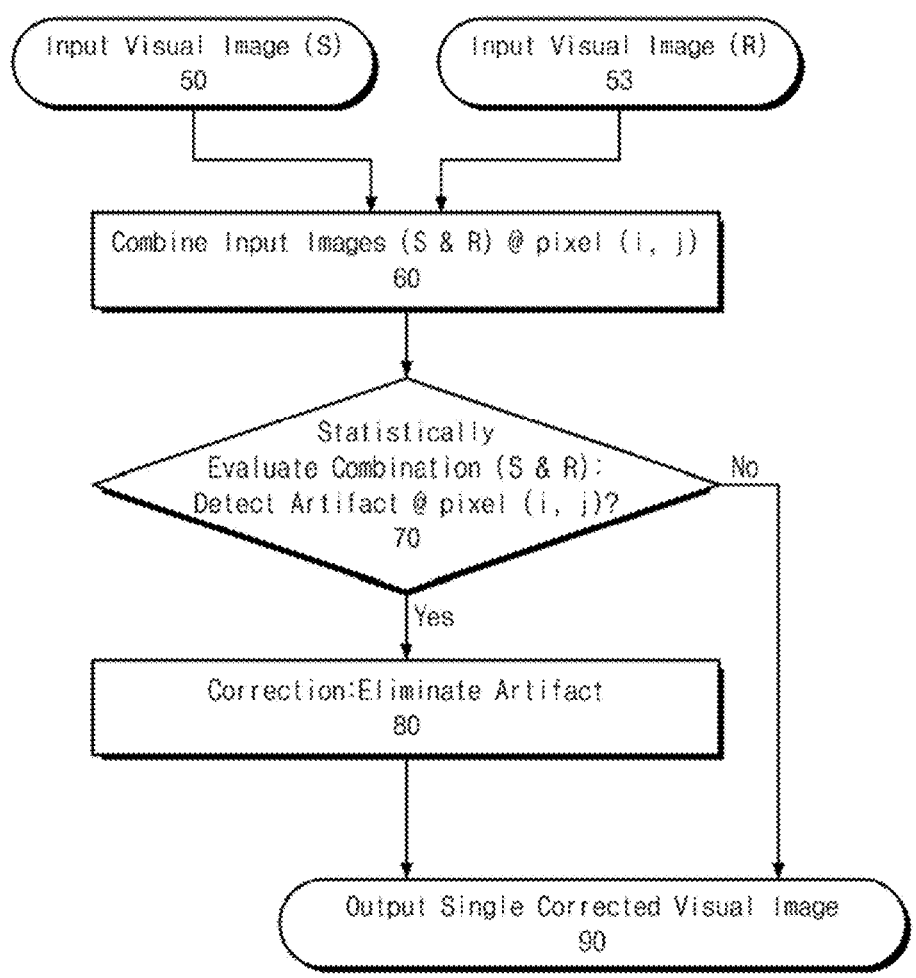
FIGS. 7 & 8—Flowcharts depicting a general process for detecting and correcting at least one artifact arising from processing multiple visual images depicting a scene.
Figure 8:
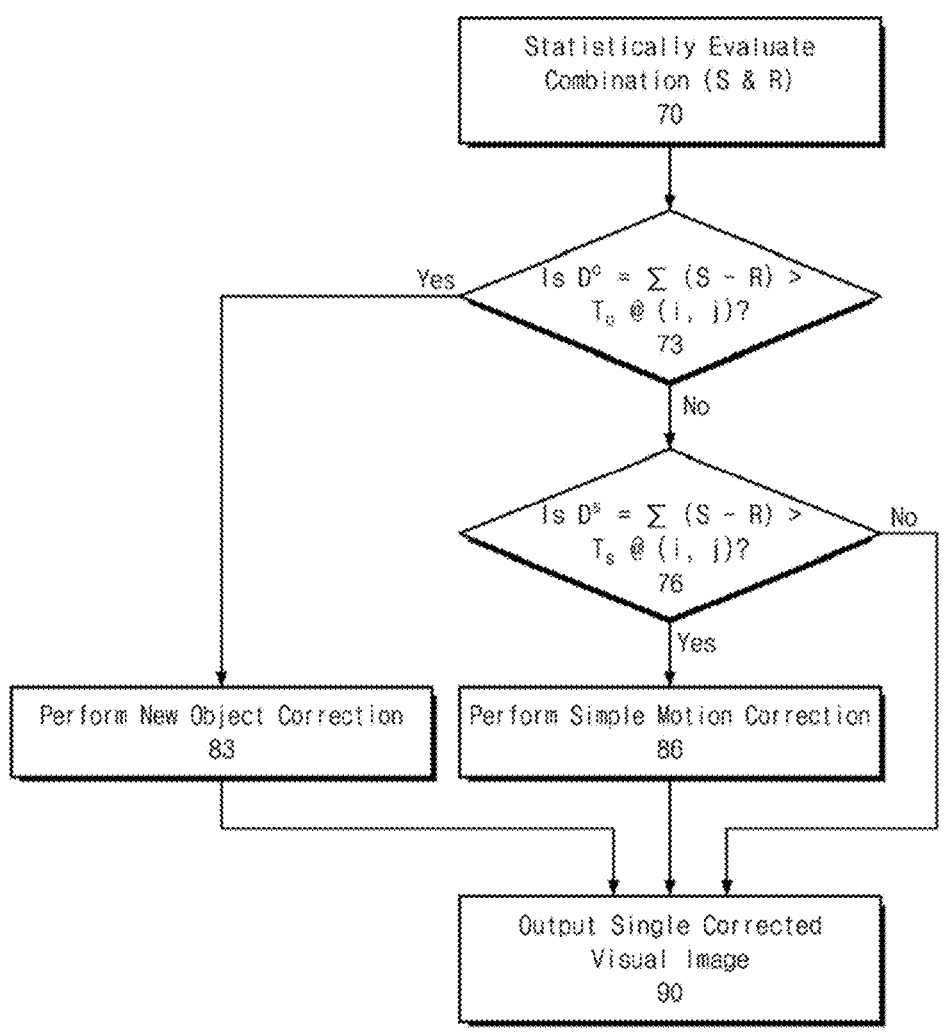

Flowcharts depicting a general process for detecting and correcting at least one artifact arising from processing multiple visual images depicting a scene according to the exemplary embodiment(s) described herein are shown in FIGS. 7 & 8. In the examples below, the detection step 70 and correction step 80 are both divided into sub-steps of new object detection/correction 73/83 and simple motion detection/correction 76/86 each having a different purpose in unwanted artifact resolution. The new object detection step 73 can identify initiation of a false positive difference between images and if a new object is detected then the new object correction step 83 can find a stable single image pixel patch to use in a corrected output image 90 while ignoring others. The simple motion detection step 76 can identify any difference between two image pixel patches (whether created due to motion or not) and if simple motion is detected then the simple motion correction step 86 can extend use of at least one of the previous image selection decisions to maintain consistency. The interplay between these steps allows artifact correction with differing levels of certainty. These techniques are described in the below examples with reference to two (2) input visual images 50/53 in a combination 60 but can be easily extended to use with more than two input images as will be further explained below.

New Object Detection

Given two visually inconsistent images having light radiation intensity value(s) (S) and (R) a decision criterion for new object detection around reference pixel (i,j) within a pixel patch array of size (P×P) according to an exemplary embodiment includes:

$$D_{S,R}^o(i,j) = \mathrm{Var}\left(\left\{\left|\frac{1}{w^2}\sum_{k=0,\ldots,w-1}\sum_{t=0,\ldots,w-1} S_{m+k,n+t} - R_{m+k,n+t}\right|\right\}_{m=i-\lfloor\frac{P}{2}\rfloor,\ldots,i+\lfloor\frac{P}{2}\rfloor-w+1, n=j-\lfloor\frac{P}{2}\rfloor,\ldots,j+\lfloor\frac{P}{2}\rfloor-w+1}\right) > T_o$$

In this equation $T_o$ is a pre-defined light radiation intensity variance threshold and the noise reduction parameter w can be used to reduce the effect of camera noise for some for some 0≤w≤P (in experiments $$w = \left\lceil\frac{P}{2}\right\rceil)$$

within a pixel patch of array size (P×P); e.g., calculating the variance is based upon averaging light radiation intensity difference value(s) for the pixel(s) in the array patch surrounding reference pixel (i,j) when $D^o(i,j)$ is calculated over natural numeric counting value(s) (m, k, n, t) that are defined (in terms of w and P) within the range set by the equation. In extending the decision to more than two images, the value $D^o_{S,R}(i,j)$ can be calculated for different combined pair(s) of images (S) and (R) and an aggregation function (such as max or average or weighted average value) can be performed over substantially all possible image combination(s).

Figure 2:
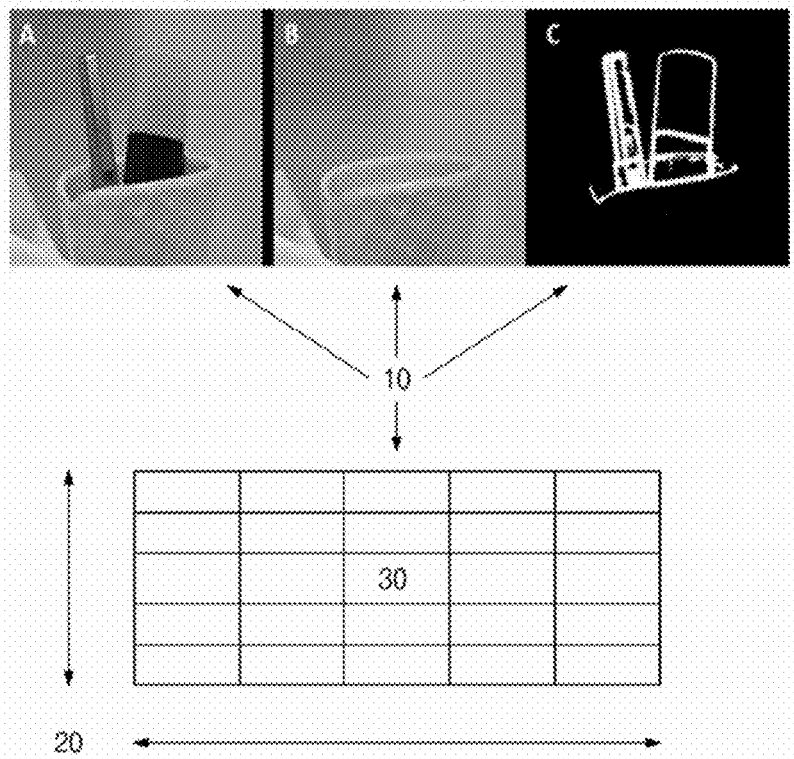
FIG. 2—Photographic illustrations of input visual images (A+B) that are processed to form an output map (C) using new object detection.

FIG. 2 shows photographic illustrations of input visual images (A+B) that are processed to form an output map (C) using the new object detection technique in which whitened shading identifies area(s) where value(s) for $D^o_{A,B}$ were found to be greater than the threshold $T_o$ for a new object artifact that has been detected. This decision criterion can detect changes in edges and corners of a visual image allowing other artifacts (in addition to new objects) to be traced in that manner.

Simple Motion Detection

Given two visually inconsistent images having light radiation intensity value(s) (S) and (R) a decision criterion for simple motion detection around reference pixel (i,j) within a pixel patch array of size (P×P) according to an exemplary embodiment includes:

$$D^s_{S,R}(i,j) = \sum_{m=i-\lfloor \frac{P}{2} \rfloor,\ldots,i+\lfloor \frac{P}{2} \rfloor-w+1} \sum_{n=j-\lfloor \frac{P}{2} \rfloor,\ldots,i+\lfloor \frac{P}{2} \rfloor-w+1} \left| \sum_{k=0,\ldots,w-1} \sum_{t=0,\ldots,w-1} S_{m+k,n+t} - R_{m+k,n+t} \right| > T_s$$

Figure 3:
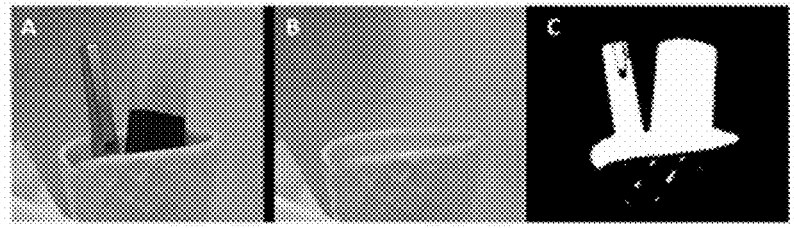
FIG. 3—Photographic illustrations of input visual images (A+B) that are processed to form an output map (C) using simple motion detection.

In this equation $T_s$ is a pre-defined light radiation intensity aggregation threshold and the noise reduction parameter w can again be used to reduce the effect of camera noise for some $0 \leq w \leq P$ (in experiments w=P) within a pixel patch of array size (P×P) when $D^s(i,j)$ is calculated for reference pixel (i,j) over natural numeric counting value(s) (m, k, n, t) that are defined (in terms of w and P) within the range set by the equation. Arriving at a single value for $D^s(i,j)$ in extending the decision to more than two images again involves use of any known aggregation function (such as max or average or weighted average value) that can be performed over substantially all possible image combination(s). FIG. 3 shows photographic illustrations of input visual images (A+B) that are processed to form an output map (C) using the simple motion detection technique in which whitened shading identifies area(s) where value(s) for $D^s_{A,B}$ were found to be greater than the threshold $T_s$ for a simple motion artifact that has been detected.

As mentioned above and as shown in FIGS. 7 & 8, the image correction process is divided into sub-steps of new object correction and simple motion correction that depend on the outcome of the detection step; e.g., if both $D^s_{A,B}>T_s$ and $D^o_{A,B}>T_o$ or if only the latter condition is true then new object correction is used (otherwise) if only the former condition is true then simple motion correction is used.

New Object Correction

In the new object correction mode for an image $(S^i)$ a threshold $(U^i)$ is set to indicate a maximum permissible normalized overall intensity value for $S^i$; e.g., above this threshold the image is "burnt" (from lengthy exposure time) and cannot be chosen. A lower threshold $(L^i)$ is also set below which the image is too "noisy" (from insufficient exposure time) and cannot be chosen. Thus given a set of images $S^1 \ldots S^N$ at a reference pixel position (i,j) the value chosen for the output image according to an exemplary embodiment includes:

IF $L^1$<neighborhood$_{ij}(S^1)$<$U^1$ THEN choose $S_{ij}^1$
ELSE IF $L^2$<neighborhood$_{ij}(S^2)$<$U^2$ THEN choose middle pixel of $S_{ij}^2$
. . .
ELSE IF $L^N$<neighborhood$_{ij}(S^N)$<$U^N$ THEN choose middle pixel of $S_{ij}^N$
ELSE choose $S_{ij}^1$ In these equation(s) neighborhood$_{ij}(S)$ is an averaging of the light radiation intensity value(s) of the pixel patch array surrounding reference pixel (i,j) which is done to reduce noise artifacts in sensor image signal (S).

Simple Motion Correction

The simple motion correction step can be used to handle a case where artifacts are suspected but not confirmed to exist. This step may be also referred to as a propagation step to extend use of at least one previous image selection decision from previously defined pixel(s); e.g., a decision on the light radiation intensity value of the pixel at position (x,y) can be determined by previously known value(s) of pixel(s) at position(s) (x–1,y),(x,y–1) and (x–1, y–1) for example.

To propagate a previous decision to a pixel (i,j) first note that simple motion detection for a pixel at position (x,y) such that x<i,y<j was already determined by some policy $$\left( p_{xy} = \frac{1}{N} \sum_{k=1,\ldots,N} W^k S^k \right)$$

for (N) examined image(s) having corresponding light radiation intensity value(s) $(S^1 \ldots S^N)$ and for some weighting function $(W^1 \ldots W^N)$ such that $(\Sigma_k W^k=1)$ when $(p_{xy})$ is calculated over natural numeric counting value (k) that is defined (in terms of N) within the range set by the equation. The propagation policy at the reference pixel (i,j) according to an exemplary embodiment then includes:

$$p_{ij} = \frac{\sum_{i-q \leq x < i, j-q \leq y < j} w_{xy}^{ij} p_{xy}}{\sum_{i-q \leq x < i, j-q \leq y < j} w_{xy}^{ij}}$$

In these equation(s), parameter (q≥1) defines the number of previously examined pixel(s) at reference position (i,j) and can be set to a small value, e.g., 3 and $(w_{xy}^{ij} \geq 0)$ is another weighting function between the pixel at position (x,y) and position (i,j): for fast approximate results this value could be simply set to 1 whereas for more accurate results this value can represent the distance between the two pixels (smaller distance-higher value) and/or the light radiation intensity difference(s) (e.g., if $|S_{xy}-S_{ij}| \leq |S_{ab}-_{ij}|$ then $w_{xy}^{ij} > w_{ab}^{ij}$) for pixel indice(s) x, a$\alpha$<i and y, b<j.

Figure 4:
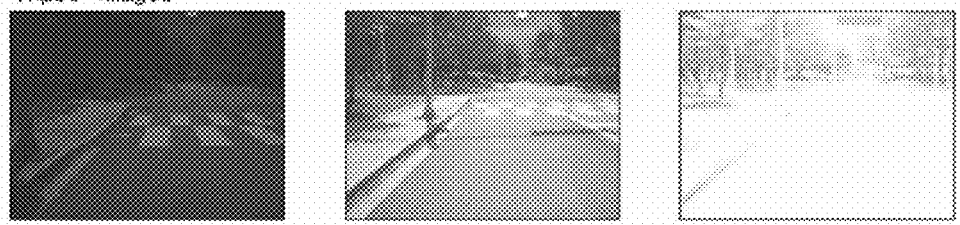
FIG. 4—Illustrations of images photographed from a moving car and combined to form a resulting HDR image with (and without) motion correction.
Figure 4:
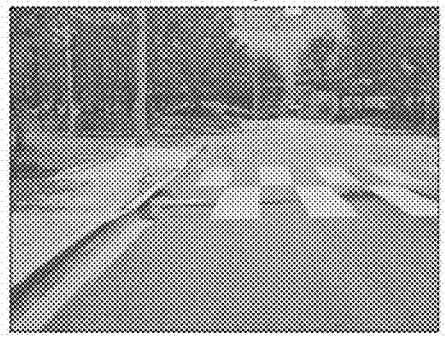
Figure 4:
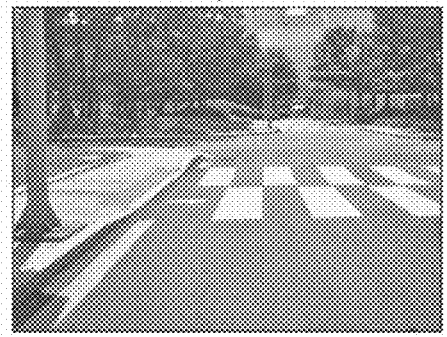
Figure 5:
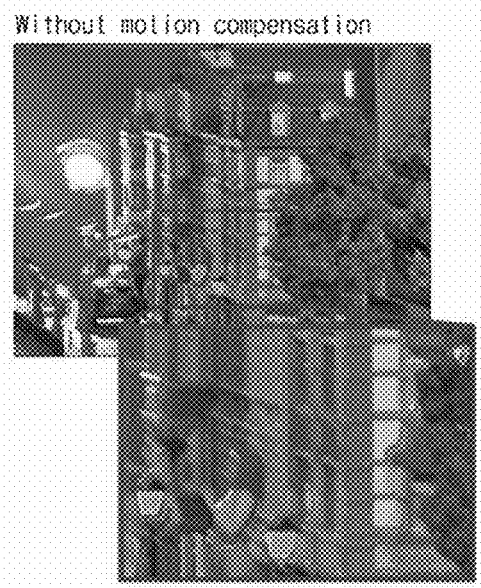
FIG. 5—Illustrations of two blurry images photographed with different exposure times and shown after correction.
Figure 5:
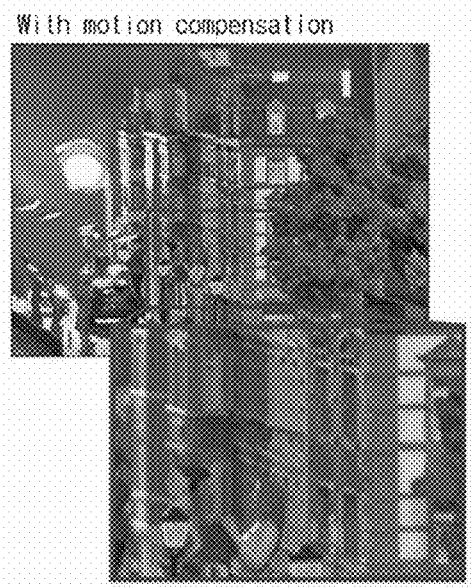

FIG. 4 shows illustrations of images photographed from a moving car and combined to form a resulting HDR image viewed with (and without) motion detection and correction. This example combines three (3) inconsistent input images photographed from a moving car showing several ghosting artifacts (such as the traffic light shadow and traffic polls appearing as new objects in inconsistent image locations) whereas those artifacts disappear after correction. FIG. 5 shows illustrations of two output HDR images with (and without) motion compensation. The input images are created using two different exposure times and with motion blur. This example combines two images by choosing only the image with the shortest exposure time in the blurry region(s) which is less likely to be blurred. In this way unwanted motion artifacts appearing in visual images with differing exposure times (such as an HDR image) can be eliminated in a fast and local manner (e.g., during real-time scanning of the image using a minimum amount of computer memory storage space) to eliminate ghosting (and other types of defects) appearing in such an image in a way that can be applied to movies as well as to RGB and/or grayscale and/or Mosaic (e.g., BAYER filter format) images for example.

Figure 6:
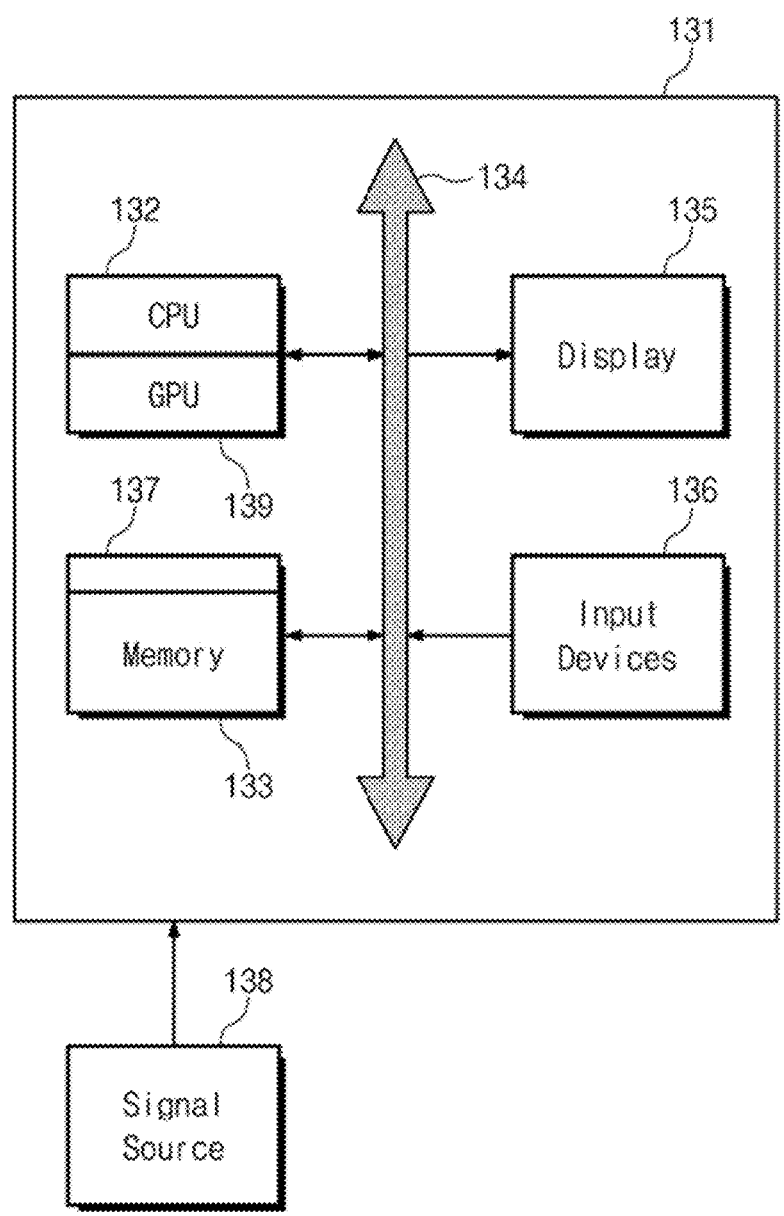
FIG. 6—A schematic diagram of a general-purpose computer configured to execute software instructions programmed to process data for detecting and correcting at least one artifact arising from processing multiple visual images depicting a scene.

As shown with reference to FIG. 6, it is to be understood that the inventive concept(s) described herein include element(s) that can be implemented on at least one general-purpose computer 131; including a signal source 138 and/or processor(s) 132/139 and/or memory 133/137 along with input/output device(s) 135/136 operatively coupled with each other via circuitry 134 which can be implemented on at least one integrated circuit and configured to operate by execution of software program instruction(s) to process data according to at least one or more exemplary embodiment(s) as described above. Thus, it is to be understood by one skilled in the art that these inventive concept(s) can be implemented using conventional computer hardware, software or a combination of both.

It will be understood by one skilled in the art that the present inventive concept(s) are only by way of example described and illustrated by reference to the foregoing description taken in conjunction with the accompanying drawings; and that the described feature(s), structure(s) and/or characteristic(s) may be combined and arranged and designed in different ways and that modification(s) and/or change(s) can be made to include device(s), system(s) and/or process(es) consistent with the inventive concept(s) as embodied in the following claims, which are to be interpreted as broadly as the law permits to cover the full scope of the invention, including all equivalents thereto.

What is claimed is:

1. A method comprised of the following steps for detecting and correcting at least one artifact arising from processing multiple visual images depicting a scene:
   combining two or more visual images input from a sensor;
   examining a local area surrounding a reference pixel found substantially within the center of an array based at an identified location within an input image;
   detecting whether an artifact is present by statistically evaluating substantially any difference in light radiation intensity between at least one combination of input images around the reference pixel location; and
   performing correction to output a single image that eliminates any one or more detected artifacts appearing in at least one or more of the input images created due to an inconsistency between input images;
   wherein the input image is comprised of at least one array of pixel locations subject to varying light radiation intensity values created by use of different image sensor exposure times;
   wherein the image combination step is comprised of one or more of:
      digitally scanning an input image in an arrayed order using a localized area surrounding the reference pixel;
      sorting the input images from shortest exposure time to longest exposure time; or
      normalizing an input image according to its exposure time.

2. The method of claim 1 wherein the artifact detection step is comprised of one or more of:
   examining a statistical variance based on averaging a light radiation intensity difference between combined input images for pixels in the array surrounding the reference pixel located within an input image; or
   performing a statistical aggregation function over the input image combinations.

3. The method of claim 2 wherein the step of examining a statistical variance is comprised of performing the following calculation:

$$D^2_{S,R}(i,j) = \text{Var}\left(\left\{\left|\frac{1}{w^2}\sum_{k=0,\ldots,w-1}\sum_{t=0,\ldots,w-1} S_{m+k,n+t} - R_{m+k,n+t}\right|\right\}_{m=i-\lfloor\frac{P}{2}\rfloor,\ldots,i+\lfloor\frac{P}{2}\rfloor-w+1, n=j-\lfloor\frac{P}{2}\rfloor,\ldots,j+\lfloor\frac{P}{2}\rfloor-w+1}\right) > T_o$$

wherein an artifact comprising a new object is detected when the value for (D) around reference pixel (i,j) is greater than a pre-defined light radiation intensity variance threshold ($T_o$) for two input images having light radiation intensity values (S) and (R) when noise reduction parameter (w) has a value such that $0 \leq w \leq P$ within a pixel array of size (P×P).

4. The method of claim 3 wherein the artifact correction step is comprised of:
   setting an upper threshold to indicate a maximum permissible normalized overall light radiation intensity value for an image without a new object artifact present;
   setting a lower threshold to indicate a minimum permissible normalized overall light radiation intensity value for an image without a new object artifact present; and
   selecting an output image from an input image having an average light radiation intensity value between the upper and lower threshold for the examined pixel array surrounding the reference pixel.

5. The method of claim 4 wherein the artifact correction step is further comprised of performing the following calculation:

IF $L^1$<neighborhood$_{ij}(S^1)$<$U^1$ THEN choose $S_{ij}^1$
   ELSE IF $L^2$<neighborhood$_{ij}(S^2)$<$U^2$ THEN choose middle pixel of $S_{ij}^2$
   . . .
   ELSE $L^N$<neighborhood$_{ij}(S^N)$<$U^N$ THEN choose middle pixel of $S_{ij}^N$
   ELSE choose $S_{ij}^1$ wherein (N) is the number of input images and (L) is the lower light radiation threshold and (U) is the upper light radiation threshold and neighborhood$_{ij}(S)$ is an average light radiation intensity value for the examined pixel array surrounding reference pixel (i,j).

6. The method of claim 2 wherein the step of performing an aggregation function is comprised of the following calculation:

$$D^s_{S,R}(i,j) = \sum_{m=i-\lfloor\frac{P}{2}\rfloor,\ldots,i+\lfloor\frac{P}{2}\rfloor-w+1}\sum_{n=j-\lfloor\frac{P}{2}\rfloor,\ldots,j+\lfloor\frac{P}{2}\rfloor-w+1}\left|\sum_{k=0,\ldots,w-1}\sum_{t=0,\ldots,w-1} S_{m+k,n+t} - R_{m+k,n+t}\right| > T_s$$

wherein an artifact comprising simple motion is detected when the value for ($D^s$) around reference pixel (i,j) is greater than a pre-defined light radiation intensity aggregation threshold ($T_s$) for two input images having light radiation intensity values (S) and (R) when noise reduction parameter (w) has a value such that 0≤w≤P within a pixel array of size (P×P).

7. The method of claim 6 wherein artifact correction is comprised of a propagation step to extend use of at least one previous output image selection decision based on at least one light radiation intensity value determined from one or more previously examined input image pixel locations.

8. The method of claim 7 wherein the propagation step is comprised of performing the following calculation:

$$p_{ij} = \frac{\sum_{i-q \leq x < i, j-q \leq y < j} w_{xy}^{ij} p_{xy}}{\sum_{i-q \leq x < i, j-q \leq y < j} w_{xy}^{ij}}$$

wherein simple motion detection for a pixel at position (x,y) such that x<i and y<j was previously determined by the function $$\left( p_{xy} = \frac{1}{N} \sum_{k=1,\ldots,N} W^k S^k \right)$$

for (N) examined input images each having a corresponding light radiation intensity value ($S^N$) and for first weighting function $W^1 \ldots W^N$ such that $\Sigma_k W^k = 1$ when q≥1; and
   wherein $w_{xy}^{ij} \geq 0$ is a second weighting function representing at least one of distance or light radiation intensity difference between the pixel at position (x,y) and reference pixel (i,j).

9. The method of claim 1 further comprising the step of noise reduction by performing the following calculation to form a high dynamic range output digital visual image:

$$(O_{x,y}) = \sum_{i=1}^{K} \frac{E^i}{\sum_{j=1}^{K} E^j} S^i$$

wherein ($O_{x,y}$) is the light radiation intensity value for a pixel at location (x,y) in the output image and wherein $$(K) = \underset{k}{\mathrm{argmax}} \{S_{x,y}^k \text{ is not burnt}\}$$

is the numeric index of an input image (S) with an exposure time (E) that yields a defined light radiation intensity value at pixel (x,y).

10. A visual image formed by carrying out a procedure comprised of the following steps for detecting and correcting at least one artifact arising from processing multiple visual images depicting a scene:
   combining two or more visual images input from a sensor;
   examining a local area surrounding a reference pixel found substantially within the center of an array based at an identified location within an input image;
   detecting whether an artifact is present by statistically evaluating substantially any difference in light radiation intensity between at least one combination of input images to determine whether a pre-defined threshold is exceeded around the reference pixel location; and
   performing correction when the threshold is exceeded to output a single image that eliminates any one or more detected artifacts appearing in at least one or more of the input images;
   wherein the input image is comprised of at least one array of pixel locations subject to varying light radiation intensity values created by use of different image sensor exposure times;
   wherein the image combination step is comprised of one or more of:
   digitally scanning an input image in an arrayed order using a localized area surrounding the reference pixel;
   sorting the input images from shortest exposure time to longest exposure time; or
   normalizing an input image according to its exposure time.

11. The visual image of claim 10 wherein the artifact detection step is comprised of one or more of:
   examining a statistical variance based on averaging a light radiation intensity difference between combined input images for pixels in the array surrounding the reference pixel located within an input image; or
   performing a statistical aggregation function over the input image combinations.

12. The visual image of claim 11 wherein the step of examining a statistical variance is comprised of performing the following calculation:

$$D_{S,R}^2(i,j) = \mathrm{Var}\left( \left\{ \left| \frac{1}{w^2} \sum_{k=0,\ldots,w-1} \sum_{t=0,\ldots,w-1} S_{m+k,n+t} - R_{m+k,n+t} \right| \right\}_{m=i-\lfloor \frac{P}{2} \rfloor,\ldots,i+\lfloor \frac{P}{2} \rfloor-w+1, n=j-\lfloor \frac{P}{2} \rfloor,\ldots,j+\lfloor \frac{P}{2} \rfloor-w+1} \right) > T_o$$

wherein an artifact comprising a new object is detected when the value for (D) around reference pixel (i,j) is greater than a pre-defined light radiation intensity variance threshold ($T_o$) for two input images having light radiation intensity values (S) and (R) when noise reduction parameter (w) has a value such that 0≤w≤P within a pixel array of size (P×P).

13. The visual image of claim 12 wherein the artifact correction step is comprised of:
   setting an upper threshold to indicate a maximum permissible normalized overall light radiation intensity value for an image without a new object artifact present;
   setting a lower threshold to indicate a minimum permissible normalized overall light radiation intensity value for an image without a new object artifact present; and
   selecting an output image from an input image having an average light radiation intensity value between the upper and lower threshold for the examined pixel array surrounding the reference pixel.

14. A computer device configured to execute software instructions programmed to process data for carrying out a procedure comprised of the following steps for detecting and correcting at least one artifact arising from processing multiple visual images depicting a scene:
- combining two or more visual images input from a camera sensor;
- examining a local area surrounding a reference pixel found substantially within the center of an array based at an identified location within an input image;
- detecting whether an artifact is present by statistically evaluating substantially any difference in light radiation intensity between at least one combination of input images around the reference pixel location;
- performing correction to eliminate any one or more detected artifacts appearing in at least one or more of the input images; and
- performing noise reduction to output a single corrected visual image;
- wherein the input image is comprised of at least one array of pixel locations subject to varying light radiation intensity values created by use of different camera sensor exposure times;

wherein the image combination step is comprised of one or more of:
- digitally scanning an input image in an arrayed order using a localized area surrounding the reference pixel;
- sorting the input images from shortest exposure time to longest exposure time; or
- normalizing an input image according to its exposure time.

15. The computer device of claim 14 wherein the artifact detection step is comprised of one or more of:
- examining a statistical variance based on averaging a light radiation intensity difference between combined input images for pixels in the array surrounding the reference pixel located within an input image; or
- performing a statistical aggregation function over the input image combinations.

16. The computer device of claim 15 wherein the step of examining a statistical variance is comprised of performing the following calculation:

$$D^2_{S,R}(i,j) = \text{Var}\left(\left\{\left|\frac{1}{w^2}\sum_{k=0,\ldots,w-1}\sum_{t=0,\ldots,w-1} S_{m+k,n+t} - R_{m+k,n+t}\right|\right\}_{m=i-\lfloor\frac{P}{2}\rfloor,\ldots,i+\lfloor\frac{P}{2}\rfloor-w+1, n=j-\lfloor\frac{P}{2}\rfloor,\ldots,j+\lfloor\frac{P}{2}\rfloor-w+1}\right) > T_o$$

wherein an artifact comprising a new object is detected when the value for (D) around reference pixel (i,j) is greater than a pre-defined light radiation intensity variance threshold ($T_o$) for two input images having light radiation intensity values (S) and (R) when noise reduction parameter (w) has a value such that $0 \leq w \leq P$ within a pixel array of size (P×P).

17. The computer device of claim 16 wherein the artifact correction step is comprised of:
- setting an upper threshold to indicate a maximum permissible normalized overall light radiation intensity value for an image without a new object artifact present;
- setting a lower threshold to indicate a minimum permissible normalized overall light radiation intensity value for an image without a new object artifact present; and
- selecting an output image from an input image having an average light radiation intensity value between the upper and lower threshold for the examined pixel array surrounding the reference pixel.

* * * * *